April 14, 1970    JEAN-NOEL G. A. ROLLAND    3,505,855
DEVICE FOR DISCRIMINATING BETWEEN TWO GASES OF
DIFFERENT VISCOSITIES
Filed Feb. 24, 1969

3,505,855
DEVICE FOR DISCRIMINATING BETWEEN TWO GASES OF DIFFERENT VISCOSITIES
Jean-Noel Gaston André Rolland, Montrouge, France, assignor to Compagnie des Compteurs, Paris, France, a French company
Filed Feb. 24, 1969, Ser. No. 801,689
Claims priority, application France, Feb. 27, 1968, 141,335
Int. Cl. G01n 11/04
U.S. Cl. 73—23                    8 Claims

ABSTRACT OF THE DISCLOSURE

A device for discriminating between two gases of different kinematic viscosities having a viscosity detector formed by a duct of great length in comparison to its diameter and terminating in a bell-shaped chamber. A recovery pipe is positioned in line with the outlet of the duct and adjacent the bell-shaped chamber. A signal is actuated by the pressure developed in the recovery pipe which is dependent upon the viscosity of the gas tested.

---

The present invention relates to a device for discriminating between two gases of different kinematic viscosities, such as oxygen and nitrous oxide, used in anaesthesia.

It is known that several accidents occur every year when oxygen and nitrous oxide are inadvertently switched while supplying surgical equipment.

The invention enables one to avoid such accidents by producing a device capable of issuing a warning signal which may be acoustical or visual, when it is connected up to a nitrous oxide supply, and of not producing this signal when it is connected up to an oxygen supply.

A device of this kind should be adapted for operating at a pressure of about 3 bars, which is the pressure usually prevailing in such equipment, its delivery should be slight i.e. a few litres per minute. Moreover, it should not require much space so that it can easily be housed in a doctor's satchel, and be of a modest price.

The invention essentially consists of actuating a warning system by means of pressure determined by a kinematic viscosity detector so that a signal called "0 pressure" is produced when the detector is supplied with a gas whose kinematic viscosity is lower, thus causing the warning to be given and so that a signal called "1 pressure" or "inhibition signal" is given when the detector is provided with a gas whose kinematic viscosity is higher thus interrupting the warning signal.

The invention has for its object a device for discriminating between two gases of different kinematic viscosities, such as oxygen and nitrous oxide, in which a viscosity detector formed by a duct of great length in comparison to its diameter is provided and this duct is extended by an abrupt bell-mouth at some distance from the outlet of which there is a recovery pipe for the jet coming from said bell-mouth, whose outlet is placed level with an aperture for communicating with the outside air, said recovery pipe collecting a substantially zero pressure, when the detector is supplied with the gas whose viscosity is the lower, and a considerable pressure when the detector is supplied with the gas whose viscosity is the greatest. Means are also provided for detecting the quantity and the pressure of the fluid in the recovery piping and for actuating signalling means.

Other characteristics of the invention will be revealed by the description which follows, made with regard to the accompanying drawing, and concerning an embodiment of the invention without limitative character.

Figure 1:
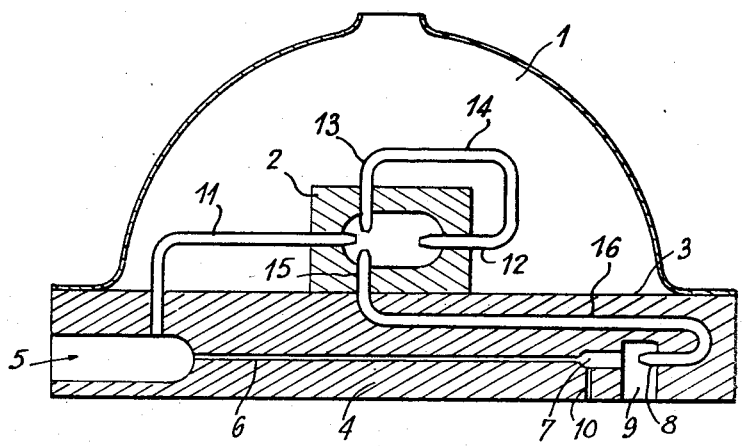
FIGURE 1 is a diagrammatical view, in cross section, of an acoustic warning system.

In FIGURE 1, there is an acoustic resonator 1, of known type, in the cavity of which a fluid oscillator 2, is housed, described further on.

The resonator 1, of general hemispherical shape, has a flat wall 3 on which the oscillator 2 rests, and below which is fixed a sole-piece 4. In the body of said sole-piece, a supply ferrule 5 is placed, for receiving either a supply of oxygen or a supply of nitrous oxide. In the extension of the ferrule 5, there is a duct 6 of small diameter and rather long (preferably at least 50 times the diameter), extending into an abrupt bell-mouth 7.

When the duct 6 is filled, it emits a stream or jet of gas into the bell-mouth 7. By means of a suitable dimensioning and because the respective viscosities of oxygen, on the one hand, and nitrous oide, on the other, this stream or jet is turbulent with nitrous oxide and laminar with oxygen. A recovery pipe 8 is placed facing the duct 6, its entrance being level with the opening 9 which communicates with the outside air. A channel 10 of very small diameter, made in the body of the sole-piece 4, opens into the bell-mouth 7, thus putting said bell-mouth into communication with the atmosphere, and keeps the jet next to the wall of the bell 7 when the jet is turbulent, as in the case of nitrous oxide.

The assembly formed by the duct 6, the bell 7 and the recovery pipe 8, is designated hereafter as a "viscosity detector."

The fluid oscillator 2 is supplied by the viscosity detector and by a supply pipe 11 connected to the ferrule 5. Said oscillator 2 comprises, in addition to the duct 11, a recovery pipe 12 for the jet coming from the duct or piping 11, a transverse control nozzle 13 emitting the output pressure of the pipe 12 by means of a counter-loop 14, and an inhibition control nozzle 15 opposite the nozzle 13. The nozzle 15 is supplied by the recovery pipe 8 of the viscosity detector, by means of a duct 16 made in the body of the sole-piece 4.

The device of FIGURE 1 works as follows:

When the ferrule 5 is connected up to a nitrous oxide piping, the jet coming from the duct 6 is turbulent, and sticks on the wall of the abrupt bell-mouth 7. The pipe 8 remains practically at atmospheric pressure, called "0 pressure." The jet emitted through the supply piping 11 of the oscillator 2, and collected by the recovery pipe 12 of said oscillator, is deviated under the action of the jet emitted through the transverse control nozzle 13 supplied by the pipe 12 through the counter-action loop 14. The pipe 12 no longer recovers the jet coming from the piping 11, which has the effect of inhibiting or suppressing the transverse control. The jet coming from the piping 11 then resumes its initial position for becoming deviated again. The oscillator 2 then begins to vibrate, its vibratory amplitude is amplified, and its frequency stabilized by the acoustic resonator 1. A whistling then occurs and one is thus warned that the supply to which the device is connected up is nitrous oxide.

When the ferrule 5 is connected to the oxygen supply, the jet coming from the duct 6 is laminar, and is recovered through the pipe 8. This thus collects a considerable pressure, called "pressure 1." This pressure is transmitted by the duct 16 to the nozzle 15, and the jet emitted by this nozzle then inhibits the action of the jet issuing from the transverse nozzle 13 of the oscillator 2. The oscillator is then no longer self-maintained and the jet coming from nozzle 11 being permanently shifted can no longer be collected by the piping 12. The oscillator 2 ceases to vibrate, and we are thus warned that the supply to which the device is connected up is really the oxygen one.

The device described can be advantageously combined with any means enabling a steady delivery supply to be ensured. Such an arrangement is described with relation to FIGURE 2 and enables the eliminating of pressure variations in the supply piping on the operating of the viscosity detector.

The device has the advantage of enabling a very distinct differentiation to be made about the nature of the two gases, which would not be possible, for instance, with a detector sensitive to the propagation speed of sound in each gas considered. Actually, we know that the frequency of a fluid oscillator, in a given gas, is proportional to the propagation speed of sound in this gas. But as, between oxygen and nitrous oxide, the ratio of frequencies is only 1.2, one could not differentiate the two gases except by testing them immediately one after the other, and provided that one has a musical ear. This disadvantage is avoided by viscosity detection: the kinematic viscosities between the two gases being in the ratio of 2 to 1, the device provides a signal of all or nothing.

Although the invention has been described with reference to a particular application, it would by no means be limited thereby. The arrangements described remain valid in all cases where it is necessary to discriminate between any two gases whose kinematic viscosities are appreciably different. Then, it is only necessary correctly to dimension the viscosity detector so as to obtain, with its abrupt bell-mouth, a jet turbulent with the gas whose viscosity is the lower, and a laminar jet with the gas whose viscosity is the higher.

Whatever the application considered, the resonator and oscillator, once they are tuned, always remain correctly adjusted because their working obeys the same law, their resonance frequency being proportional to the propagation speed of the sound in the gas considered. The oscillator can easily be tuned on the resonance frequency of the cavity of the resonator by properly regulating the length of the counter-reaction loop.

Figure 2:
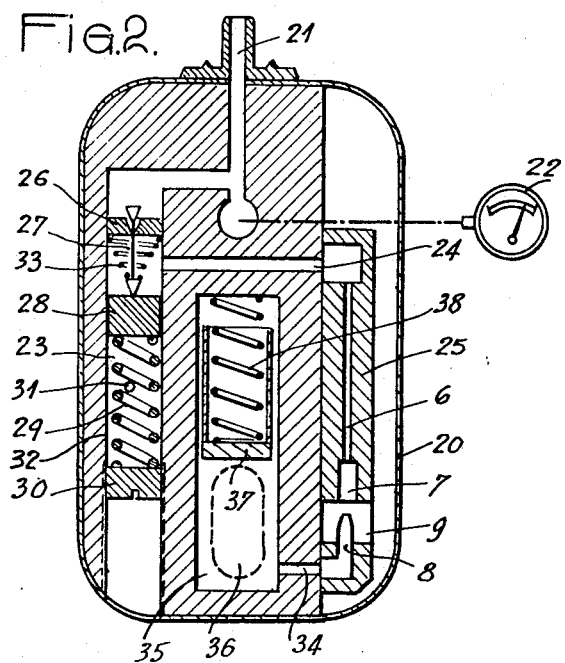
FIGURE 2 is a diagrammatical view, in cross section, of a visual warning system.

Another embodiment of the device of the invention is shown in FIGURE 2. The device is enclosed in a casing 20 in the body of which a supply pipe 21 is provided for receiving a connection which can be branched either to the oxygen supply or to the nitrous oxide supply. The pipe 21 is connected to a manometer 22 placed, for instance, on the top of the casing 20 for showing the pressure prevailing in the pipe. The pipe 21 communicates with an escape valve 23, to ensure a steady pressure supply in the piping 24, leading to a detecting device similar to that of FIGURE 1 shown on the whole at 25.

The escape valve 23 comprises a clack-valve 26 enabling the intake of gas coming from the piping through the pipe 21. The clack of the device 26 is connected by a rod 27 to a piston 28 thrust by a spring 29 and a regulating screw 30. An aperture 31 is provided for maintaining the chamber containing the piston 28 at atmospheric pressure.

A spring 33 connected to the rod 27 of the clack-valve holds the rod against the piston 28. Thus, if the pressure in the pipe 21 becomes too high, the clack-valve tends to be closed while limiting, then, the inlet of gas to the escape valve.

The detecting device 25 comprises, as shown in FIG. 1, the cylindrical duct 6 of small diameter and rather great length, extended by an abrupt bell-mouth 7; it also comprises the recovery pipe 8 placed opposite the duct 6, its outlet being level with the aperture 9 communicating with the open air.

The outlet of the recovery piping 8 is connected up by a duct 34 to a chamber 35 called an optical warning. This chamber comprises, behind a window 36 made in the casing 20, a piston 37 thrust by a spring 38.

The spring 38 is so provided that when the piston 37 is at rest, it can be seen through the window 36.

When the device is connected up to the gas to be checked, the detector 25 is supplied under steady pressure by means of the escape-valve 23.

With oxygen which, as already stated, has a high viscosity coefficient, the flow in the detector through the duct 6 is laminar and produces a jet of gas directed straight to the recovery pipe 8. The pressure applied to the indicating piston 37 is high and said piston is moved up from the window 36.

With nitrous oxide, on the other hand, the flow is turbulent and sticks to the wall of the abrupt bell-mouth 7. The gas does not then penetrate into the recovery piping 8. The pressure applied to the indicating piston 37 is that called "0" and said piston remains in its inactive or lower position and can be seen through the window 36.

I claim:

1. A device for distinguishing between two gases having different kinematic viscosities comprising a detector provided with a main duct having a length substantially greater than its diameter, means for introducing one of said gases into the inlet end of said main duct, the outlet end of said duct being enlarged to form a bell having a diameter greater than said duct, a recovery pipe having its inlet end spaced from and in substantial alignment with the bell and duct, the space between said bell and the inlet of said recovery pipe being open to the atmosphere, whereby when the gas of lower viscosity is introduced into the inlet end of said main duct substantially no pressure is created in the recovery pipe and when the gas of higher viscosity is introduced into the inlet end of said duct, a substantial pressure is created in said recovery pipe, and means for distinguishing between the pressures.

2. A device as claimed in claim 1 wherein said detector is provided with a channel extending from the base of the bell to the atmosphere to ensure that the gas of lower viscosity when passing into the bell will be directed against the walls thereof.

3. A device as claimed in claim 1 wherein said means for introducing one of said gases into said main duct includes an escape valve to assure constant pressure of gas in said main duct.

4. A device as claimed in claim 1 wherein said distinguishing means comprises a vibratory sound device actuated by the pressure of gas in said recovery pipe.

5. A device as claimed in claim 4 wherein said vibratory sound device comprises an acoustic resonator, an oscillator disposed therein, and provided with a chamber, a supply duct communicating with the inlet end of the main duct for supplying gas to said chamber, a counter reaction duct spaced from and in alignment with the exit end of said supply duct for normally recovering gas flowing from said supply duct and for redirecting gas flowing therein back into said chamber transversely of the line of normal flow between the exit of said supply duct and the entrance of said counter reaction duct, said recovery pipe directing a gas flowing therein to said chamber to inhibit the effect of the flow of gas issuing from said counter reaction duct into said chamber.

6. A device as claimed in claim 5 wherein the length of the counter reaction duct may be varied whereby said oscillator may be tuned to the resonant frequency of said resonator.

7. A device as claimed in claim 1 wherein said distinguishing means comprises an optical device actuated by the pressure of gas in said recovery pipe.

8. A device as claimed in claim 7 wherein said optical device comprises a resiliently mounted piston responsive to the pressure of gas within said recovery pipe and means for viewing movement of said piston.

References Cited

UNITED STATES PATENTS

| | | | |
|---|---|---|---|
| 3,086,368 | 4/1963 | Kapff | 73—54 X |
| 3,144,767 | 8/1964 | Testerman et al. | 73—24 X |
| 3,229,501 | 1/1966 | Henze et al. | 73—23.1 |
| 3,392,571 | 7/1968 | Roof | 73—23.1 X |

S. CLEMENT SWISHER, Primary Examiner

J. W. ROSKOS, Assistant Examiner

U.S. Cl. X.R.

73—54